US009420153B2

(12) United States Patent
Tanaka et al.

(10) Patent No.: US 9,420,153 B2
(45) Date of Patent: Aug. 16, 2016

(54) ELECTRONIC ENDOSCOPE SYSTEM (71) Applicant: HOYA CORPORATION, Shinjuku-ku, Tokyo (JP)

(72) Inventors: Chinari Tanaka, Saitama (JP); Shinichi Takayama, Tokyo (JP); Tetsuya Utsui, Saitama (JP); Yoshimi Obara, Tokyo (JP)

(73) Assignee: HOYA CORPORATION, Tokyo (JP)

( * ) Notice: Subject to any disclaimer, the term of this patent is extended or adjusted under 35 U.S.C. 154(b) by 326 days.

(21) Appl. No.: 13/716,338

(22) Filed: Dec. 17, 2012

(65) Prior Publication Data

US 2013/0162790 A1    Jun. 27, 2013

Related U.S. Application Data (63) Continuation of application No. 13/577,742, filed as application No. PCT/JP2011/050617 on Jan. 17, 2011, now abandoned.

(30) Foreign Application Priority Data

Feb. 10, 2010    (JP) .................................. 2010-027269

(51) Int. Cl.
  *H04N 5/00*    (2011.01)
  *H04N 7/18*    (2006.01)
  (Continued)

(52) U.S. Cl.
  CPC ............. *H04N 5/2256* (2013.01); *H04N 5/238* (2013.01)

(58) Field of Classification Search
  CPC ............. A61B 1/06; A61B 1/04; G06K 9/00; H04N 7/18
  See application file for complete search history.

(56) References Cited

U.S. PATENT DOCUMENTS 4,878,113 A    10/1989 Nakamura
8,303,493 B2    11/2012 Yabe et al.
(Continued)

FOREIGN PATENT DOCUMENTS

CN    101010029    8/2007
CN    101617933    1/2010
(Continued)

OTHER PUBLICATIONS

Japanese Office Action in corresponding Japanese Patent Application No. 2011-553776 dated May 30, 2014, along with an English-language translation thereof.

(Continued)

*Primary Examiner* — Sath V Perungavoor
*Assistant Examiner* — Patricia I Young
(74) *Attorney, Agent, or Firm* — Greenblum & Bernstein, P.L.C.

(57) ABSTRACT

An electronic endo scope system includes a light source that emits light including at least a visible light band, an optical filter that has a transmittance peak at a particular wavelength within a continuous wavelength band including at least the visible light band and that has a transmittance distribution which is based on the transmittance peak within an entire of the continuous wavelength band except the transmittance peak, an optical filter switching unit that inserts and retracts the optical filter into and out of an illumination optical path of the light source, a color solid state image pick-up device that receives reflected light from a subject illuminated with illumination light which has passed, or not passed, through the optical filter, and an image generating unit that generates a color image displayable on a monitor by processing an imaging signal output by the solid state image pick-up device.

6 Claims, 5 Drawing Sheets (51) Int. Cl.
*A61B 1/06* (2006.01)
*A61B 1/04* (2006.01)
*G06K 9/00* (2006.01)
*H04N 5/225* (2006.01)
*H04N 5/238* (2006.01)

(56) References Cited

U.S. PATENT DOCUMENTS

| | | |
|---|---|---|
| 8,531,512 B2 | 9/2013 | Gono et al. |
| 8,581,970 B2 | 11/2013 | Yamazaki et al. |
| 2003/0176768 A1 | 9/2003 | Gono et al. |
| 2004/0046865 A1* | 3/2004 | Ueno et al. ............... 348/70 |
| 2008/0281154 A1 | 11/2008 | Gono et al. |
| 2008/0294105 A1 | 11/2008 | Gono et al. |
| 2009/0040298 A1 | 2/2009 | Yamazaki et al. |

FOREIGN PATENT DOCUMENTS

| | | |
|---|---|---|
| JP | 1-297042 | 11/1989 |
| JP | 2001-170009 | 6/2001 |
| JP | 2002-95635 | 4/2002 |
| JP | 2005-152367 | 6/2005 |
| JP | 2006-166940 | 6/2006 |
| JP | 2007-29453 | 2/2007 |
| JP | 2007-244681 | 9/2007 |
| WO | 2007/108270 | 9/2007 |

OTHER PUBLICATIONS

U.S. Appl. No. 13/577,742 to Chinari Tanaka et al., filed Aug. 8, 2012.
PCT International Preliminary Report on Patentability, mail date is Jun. 5, 2012 (along with English-language translation thereof).
Chinese Official Action for CN 201180008667.0 dated Jan. 30, 2015, along with an English-language translation thereof.
Chinese Office Action for CN App. No. 201180008667.0 mailed on Jul. 27, 2015, along with English-language translation thereof.
Japanese Office Action for JP App. No. 2011-553776 mailed on Oct. 2, 2014, along with English-language translation thereof.

* cited by examiner

ELECTRONIC ENDOSCOPE SYSTEM

CROSS-REFERENCE TO RELATED APPLICATIONS

The present application is a continuation of pending U.S. patent application Ser. No. 13/577,742, filed on Aug. 8, 2012, which is National Stage of International Patent Application No. PCT/JP2011-050617 filed Jan. 17, 2011, which claims priority under 35 U.S.C. §119 of Japanese Application No. 2010-027269 filed on Feb. 10, 2010, the disclosures of which are expressly incorporated by reference herein in their entireties.

TECHNICAL FIELD

The present invention relates an electronic endoscope system for observing a color image of a subject, and more specifically to an electronic endoscope system suitable for allowing an operator to observe the entire structure of a particular organism.

BACKGROUND ART

As a system for making a diagnosis on an inner portion of a body cavity of a patient, an electronic endoscope system is generally known, and has been put into practical use. An electronic endoscope having a function of illuminating a subject with light via a narrow band filter which allows light having a wavelength band, within which a particular organism exhibits a high absorption property, to pass therethrough, and generating a spectral image highlighting the particular organism by receiving a scattered light component from the subject is known. However, in the electronic endoscope system of this type, the observable wavelength band is fixed. Therefore, there is a problem that a normal color image cannot be obtained, and it is impossible to conduct a comparative diagnosis between a normal color image and a spectral image.

For this reason, for example, Japanese Patent Provisional Publication No HEI 1-297042A (hereafter, referred to as patent document 1) proposes an electronic endoscope system which makes it possible to conduct a comparative diagnosis. Specifically, the electronic endoscope system described in patent document 1 is configured to control the wavelength band of illumination light by switching the bandpass filter turret arranged on an illumination light path and to selectively generate a spectral image and a normal color image. By shooting both of these images and then making a comparison between these images, it becomes easier to understand the relationship between a particular organism and another organism, and therefore advantages that the accuracy of a diagnosis is enhanced can be expected.

SUMMARY OF THE INVENTION

However, in the electronic endoscope system described in the patent document 1, it is impossible to simultaneously observe both of a spectral image and a normal color image, and therefore it is only possible to make an observation while indirectly comparing both of the images. For this reason, there is drawback that it is not always possible to precisely determine the relationship between a particular organism and another organism. Furthermore, there is a drawback that, since the light amount is cut off largely by the narrowband filter, the brightness of the obtained image is low.

The present invention is made in view of the above described circumstances. That is, the object of the present invention is to provide an electronic endoscope system suitable for enhancing the brightness of a spectral image which highlights a particular organism and suitable for allowing an operator to understand the relationship between the particular organism and another organism.

To solve the above described problem, according to an embodiment of the invention, there is provided an electronic endoscope system including a light source that emits light including at least a visible light band, an optical filter that has a transmittance peak at least at a particular wavelength band within a continuous wavelength band including at least the visible light band and that has a transmittance distribution which is larger than zero and is smaller than a half of the transmittance peak within an almost entire region of the continuous wavelength band excepting the transmittance peak; a color solid state image pick-up device that receives reflected light from a subject illuminated with illumination light via the optical filter; and an image generating unit that generates a color image which can be displayed on a monitor by processing an imaging signal output by the solid state image pick-up device, and the optical filter has the transmittance distribution satisfying: (1) having the transmittance peak at at least one of particular wavelength bands of 380 nm to 420 nm, 470 nm to 490 nm and 550 nm to 560 nm; and (2) the at least one of particular wavelength bands in (1) necessarily includes at least one of particular wavelength bands of 380 nm to 420 nm and 550 nm to 560 nm. The electronic endoscope system according to the invention may further include an optical filter switching unit that inserts the optical filter into an illumination optical path of the light source and retracts the optical filter from the illumination optical path.

When a subject is illuminated via the optical filter according to the invention, it is possible to generate a spectral image whose brightness is enhanced while including the particular organism and another organism in one screen and to display the image on a display screen of a monitor. In addition, by retracting the optical filter from the illumination optical path as appropriate, it is possible to display a normal color image on the display screen. As the particular wavelength, the wavelength suitable for absorption by hemoglobin can be considered. The wavelength suitable for absorption by hemoglobin is, for example, around 400 nm or around 550 nm.

The electronic endoscope system according to an embodiment may further comprising an operation means that accepts an input operation of a user. In this case, the optical filter switching means inserts the optical filter into the illumination optical path or retracts the optical filter from the illumination optical path in accordance with the input operation accepted by the operation means.

According to the invention, an electronic endoscope system suitable for enhancing the brightness f an spectral image highlighting the particular organism and for allowing an operator to recognize the relationship between the particular organism and another organism.

EMBODIMENTS FOR CARRYING OUT THE INVENTION

In the following, an electronic endoscope system according to an embodiment of the invention is explained with reference to the accompanying drawings.

Figure 1:
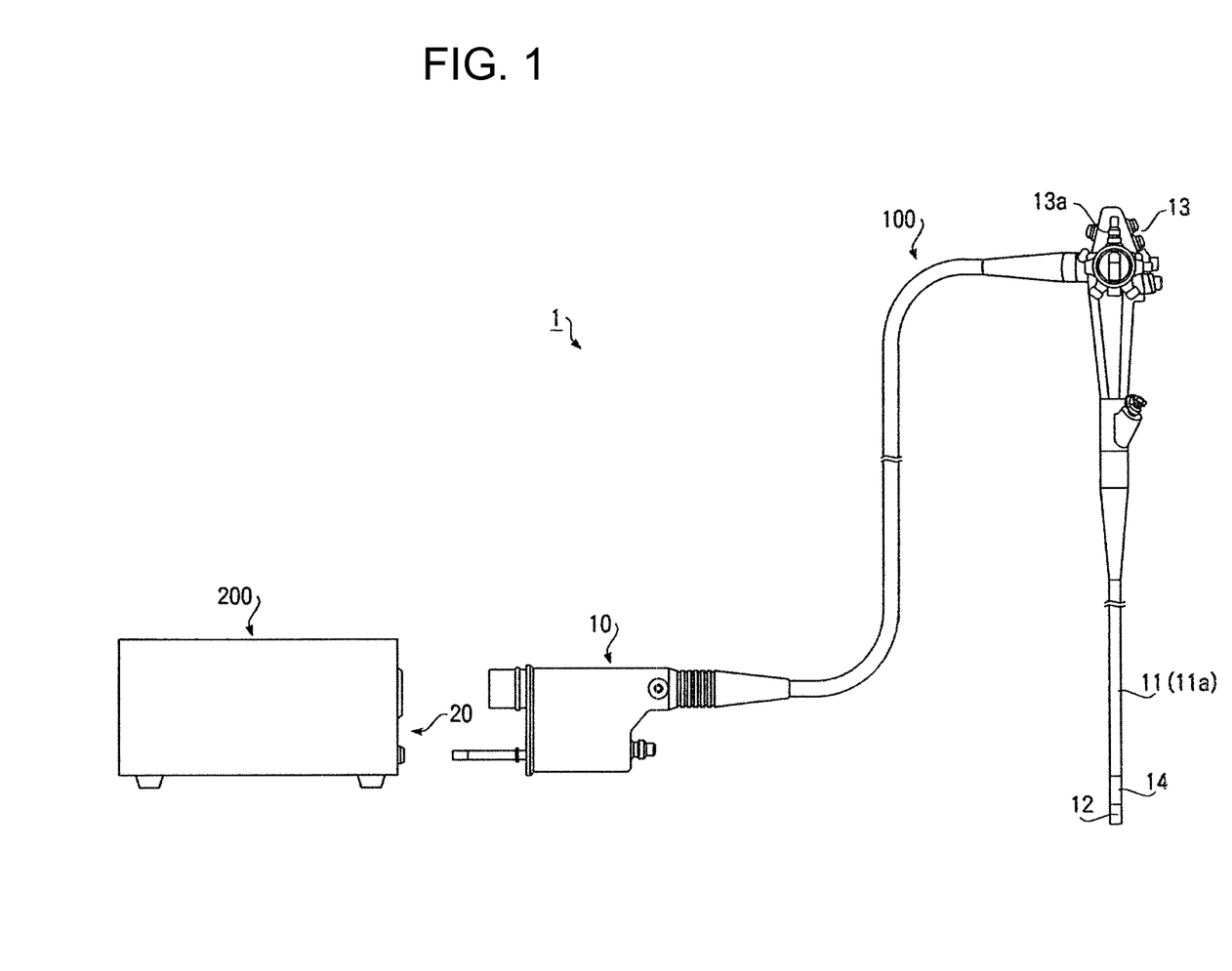
FIG. 1 is an outer appearance of an electronic endoscope system according to an embodiment of the invention.

FIG. 1 is an outer appearance of an electronic endoscope system 1 according to the embodiment. As shown in FIG. 1, the electronic endoscope system 1 includes an electronic scope 100 for imaging a subject. The electronic scope 100 includes a flexible tube 11 covered with a flexible sheath 11a. To a tip of the flexible tube 11, a tip part 12 covered with a resin housing having rigidity is connected. A bending part 14 provided at a joint part of the flexible tube 11 and the tip part 12 is configured to be able to bend freely by a remote control (specifically, an rotation operation for a bending operation knob 13a from a hand operation unit 13 connected to a proximal end of the flexible tube 11. This bending mechanism is a known mechanism installed in a general endoscope, and is configured to bend the bending part 14 by drawing of an operation wire in conjunction with rotation of the bending operation knob 13a. Since the direction of the tip part 12 in accordance with the bending motion by the above described operation, an imaging area of the electronic scope 100 moves.

As shown in FIG. 1, the electronic endoscope system 1 includes a processor 200. The processor 200 is provided integrally with a signal processing device which processes signals from the electronic scope 100, and a light source device which illuminates the inside of a body cavity to which natural light is not able to reach. In another embodiment, the signal processing device and the light source device may be provided separately.

The processor 200 is provided with a connector part 20 which corresponds to a connector part 10 provided at a proximal end of the electronic scope 100. The connector part 20 has a connection structure corresponding to the connector par 10, and is configured to electrically and optically connect the electronic scope 100 with the processor 200.

Figure 2:
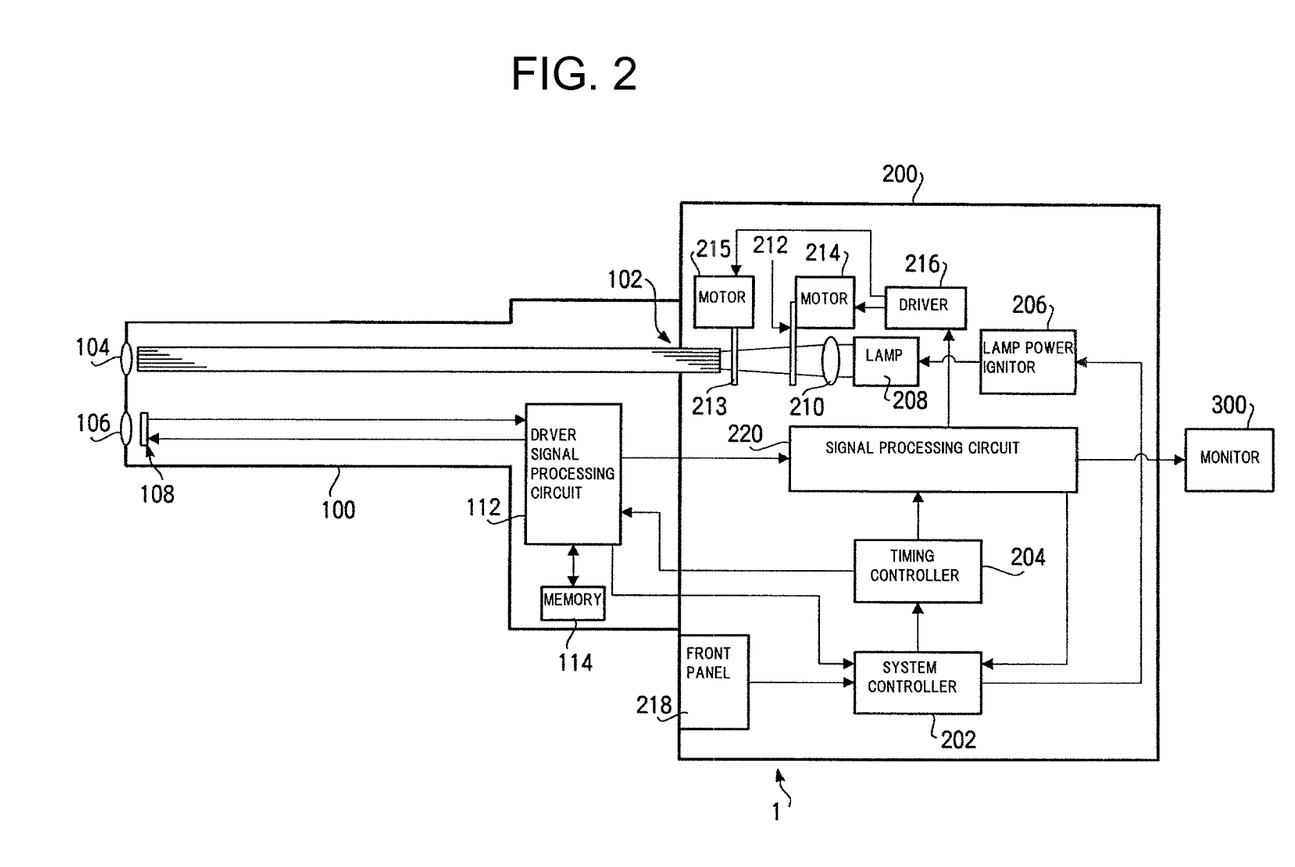
FIG. 2 is a block diagram illustrating a configuration of the electronic endoscope system according to the embodiment of the invention.

FIG. 2 is a block diagram illustrating a configuration of the electronic endoscope system 1. As shown in FIG. 2, the electronic endoscope system 1 includes a monitor 300 connected to the processor 200 via a predetermined cable. In FIG. 1, the monitor 300 is omitted for the sake of simplicity.

As shown in FIG. 2, the processor 200 includes a system controller 202 and a timing controller 204. The system controller 202 controls components constituting the electronic endoscope system 1. The timing controller 204 outputs clock pulses for adjustment of processing timings for signals to the various circuits in the electronic endoscope system 1.

After activation by a lamp power igniter 206, a lamp 208 emits light having a spectrum extending mainly from a visible light band to an infrared light band which is invisible (or light including at least a visible light band). As the lamp 208, a high luminance lamp, such as a xenon lamp, a halogen lamp and a metal halide lamp, is appropriate. The illumination light emitted from the lamp 208 is converged by a condenser lens 210, and the light amount thereof is limited to an appropriate amount via an aperture stop 212.

To the aperture stop 212, a motor 214 is mechanically connected via a transmission mechanism, such as an arm and a gear, (not shown). The motor 214 is, for example, a DC motor, and is driven under drive control of a driver 216. In order to adjust the brightness of video displayed on the monitor 200, the opening of the aperture stop 212 is changed by the motor 214 so that the amount of light emitted from the lamp 208 is limited in response to the opening. A reference for determining an appropriate brightness of video is changed in response to an operation for adjusting brightness by an operator with respect to a front panel 218. It should be noted that a photometric circuit for adjusting brightness by controlling the driver 216 is a known circuit, and therefore explanation thereof is omitted in this specification.

Various types of configurations can be employed for the front panel 218. Examples of specific configurations of the front panel 218 include hardware keys mounted on a front surface of the processor 200, a touch panel type GUI (Graphical User Interface) and a combination of hardware keys and a GUI.

The illumination light which has passed through the aperture stop 212 is spectrally separated by an optical filter 213 and is incident on an entrance facet of a LCB (Light Carrying Bundle). To the optical filter 213, a motor 215 for driving under drive control of the driver 216 is mechanically connected via a transmission mechanism, such as an arm and a gear, (not shown). The motor 215 inserts the optical filter 213 into an optical path or retracts the optical filter 213 from the optical path in accordance with a switching operation with respect to the front panel 218 by the operator. During a time period in which the optical filter 213 has been retracted from the optical path, the illumination light which has passed through the aperture stop 212 enters directly to the entrance facet of the LCB 102. As the motor 215, for example, a galvano motor or a servo motor can be used.

The illumination light which has entered to the entrance facet of the LCB 102 propagates through the LCB 102 while repeating the total reflection. The illumination light which has propagated through the LCB 102 exits from an exit facet of the LCB 102 provided as a tip of the electronic scope 100. The illumination light which has exited from the exit facet of the LCB 102 illuminates the subject via a light distribution lens 104. The reflected light from the subject forms an optical image on a photoreception surface of a solid state image pick-up device 108.

The solid state image pick-up device 108 is, for example, a single-chip color CCD (Charge Coupled Device) image sensor, and is configured to accumulate charges corresponding to the light amount of the optical image formed on pixels on the photoreception surface and convert the optical image into an imaging signal corresponding respective colors of R, G and B. The converted imaging signal is amplified by a pre-amplifier, and thereafter is output to the signal processing circuit 220 via a driver signal processing circuit 112. In another embodiment, the solid state image pick-up device 108 may be a CMOS (Complementary Metal Oxide Semiconductor) image sensor.

The driver signal processing circuit 112 accesses a memory 144 and reads unique information of the electronic scope 100. The unique information of the electronic scope 100 includes, for example, the number of pixels and the sensitivity of the solid state image pick-up device 108, the supported rate and the model number. The driver signal processing circuit 112 outputs the unique information read from the memory 114 to the system controller 202.

The system controller 202 executes calculations based on the unique information of the electronic scope 100, and generates controls signals. The system controller 202 controls the operations and timings of the various circuits of the processor 200 by using the generated control signals so that appropriate processes are executed for the electronic scope being connected to the processor 200. The system controller 202 may be configured to have a table in which the model number of the electronic scope and the control information suitable for the electronic scope having the model number are associated with each other. In this case, by referring to the control information in the association table, the system controller 202 controls the operations and timings of the various circuits in the processor 200 so that an appropriate process can be executed for the electronic scope being connected to the processor 200.

The timing controller 204 supplies the clock pulses to the driver signal processing circuit 112 in accordance with timing control by the system controller 202. In accordance with the clock pulses supplied from the timing controller 214, the driver signal processing circuit 112 drives and controls the solid state image pick-up device 108 at timing which is in synchronization with the frame rate of the video processed on the processor 200 side.

To the signal processing circuit 220, the imaging signal from the driver signal processing circuit 112 is inputted. The imaging signal is subjected to various processes including clamping, knee, interpolation, AGC (Auto Gain Control) and AD conversion, and is buffered into frame memories (not shown) for respective color signals of R, G and B on a frame-by-frame basis. Each buffered color signal is swept out from the frame memory at timings controlled by the timing controller 204, and is converted into a video signal complying with a predetermined standard, such as NTSC (National Television System Committee) or a PAL (Phase Alternating Line). The converted video signal is sequentially inputted to the monitor 300, and thereby the image of the subject is displayed on the display screen of the monitor 300. More specifically, during a time period in which the subject is illuminated while the optical filter 213 is inserted into the optical path, the spectral image highlighting a particular organism is displayed. During a time period in which the subject is illuminated while the optical filter 213 is retracted from the optical path, the normal color image is displayed.

Figure 3:
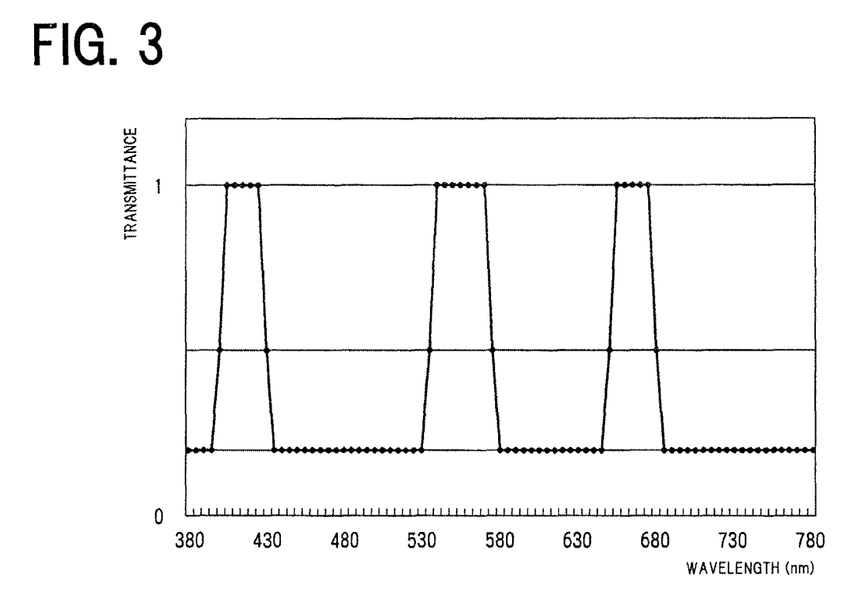
FIG. 3 is a graph illustrating a spectral property of an optical filter provided in a processor according to the embodiment of the invention.

FIG. 3 is a graph illustrating the spectral property of the optical filter 213. The vertical axis of FIG. 3 represents the normalized transmittance, and the horizontal axis represents the wavelength (unit: nm). As shown in FIG. 3, the spectral property of the optical filter 213 has transmittance peaks near 400 nm, 550 nm and 650 nm, and has the transmittance larger than or equal to a certain value at least in a range extending from the visible band to the infrared band (e.g., 380 nm to 1000 nm).

The transmittance larger than equal to the certain value in the range extending from the visible band to the infrared band is larger than 0 and is smaller than the half of each transmittance peak. In this embodiment, by intentionally setting the transmittance of light other than the particular wavelength for highlighting the particular organism to be a large value, it becomes possible to suppress the light amount cut by the optical filter 213 and to increase the brightness of the spectral image, and it becomes possible to concurrently shoot the image of another organism other than the particular organism. Furthermore, by setting the transmittance to be smaller than the half value of each transmittance peak, decrease of the detection sensitivity with respect to the particular organism can also be effectively suppressed. That is, according to the embodiment, by illuminating the subject via the optical filter 213, it is possible to simultaneously include the particular organism and another organism on one screen, and to display the spectral image whose brightness is enhanced on the display screen of the monitor 300.

Figure 4:
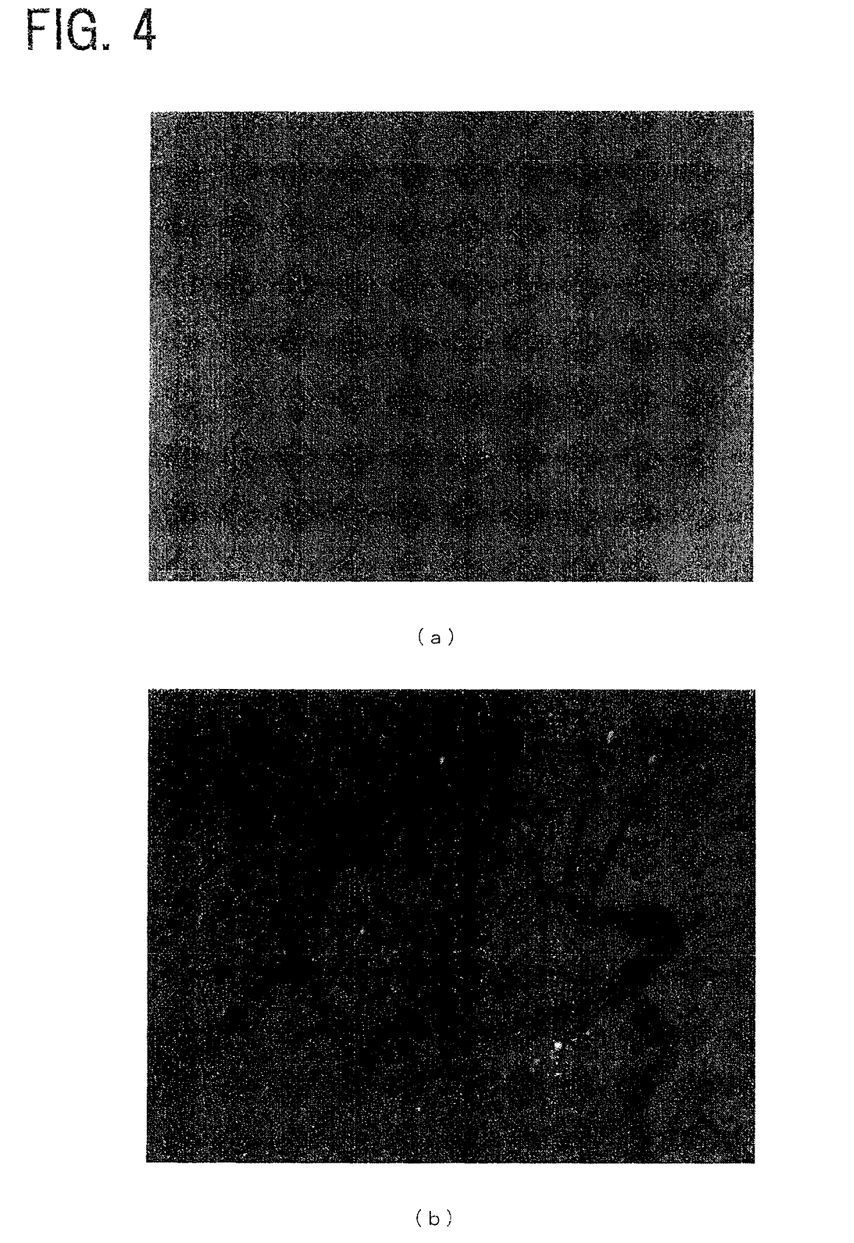
FIG. 4 shows observation images obtained when a subject is illuminated with an optical filter and when the subject is illuminated without the optical filter.

FIG. 4(a) shows an observation image obtained when a subject is illuminated without using the optical filter 213, and FIG. 4(b) shows an observation image obtained when the subject is illuminated via the optical filter 213. The images of FIG. 4(a) and FIG. 4(b) are images of the same subject (a buccal cavity). As shown in FIG. 4(a), when the light does not pass through the optical filter 213, a mucous membrane structure in the buccal cavity is observed as a brighter image. Since a particular organism is not highlighted, the image is totally flat. As shown in FIG. 4(b), when the light passes through the optical filter 213, the mucous membrane structure in the buccal cavity is observed as a brighter image together with a particular organism while the particular image is highlighted. The bands near the 400 nm and 550 nm corresponding to the transmittance peaks tend to be absorbed by hemoglobin. Therefore, the particular organism observed here is a blood vessel in the buccal cavity. Since the illumination light emitted using the optical filter 213 is not narrow band light but is wide band light, various types of organisms can be observed in accordance with respective invasion depths of wavelengths.

Figure 5:
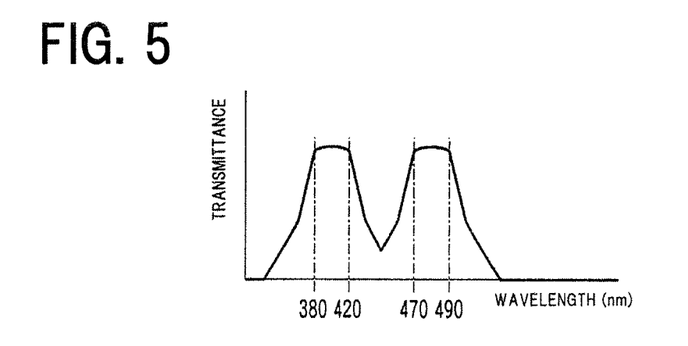
FIG. 5 is a graph illustrating a spectral property of an optical filter of a processor according to another embodiment.
Figure 6:
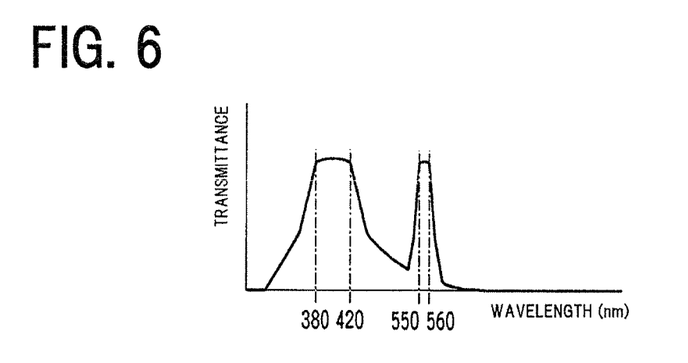
FIG. 6 is a graph illustrating a spectral property of an optical filter of a processor according to another embodiment.
Figure 7:
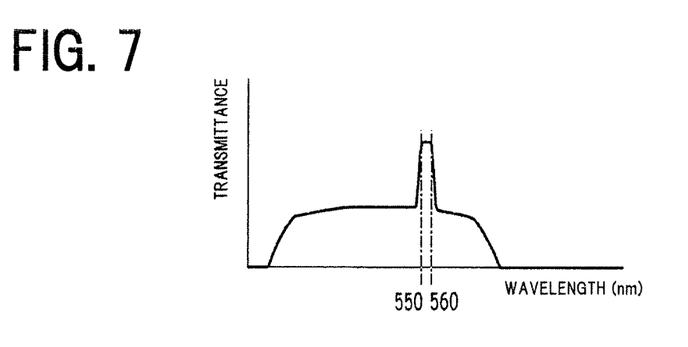
FIG. 7 is a graph illustrating a spectral property of an optical filter of a processor according to another embodiment.

The foregoing is the embodiment of the invention. The invention is not limited to the above described configuration, but can be varied in various ways within the technical concept of the invention. For example, the spectral property of the optical filter 213 is not limited to that shown in FIG. 3, but can be appropriately set in accordance with an organism of an observation target. FIGS. 5 to 7 illustrate examples of such spectral properties. In each of FIGS. 5 to 7, the vertical axis represents the transmittance and the horizontal axis represents the wavelength. In each of the spectral properties, at least one transmittance peak exists in a predetermined wavelength band, and the transmittance which is larger than zero and smaller than the half of the transmittance peak distributes over a wide band (at least over a visible band). In addition, the spectral property in FIG. 5 has the transmittance peak at the wavelength band (380 nm to 420 nm) suitable for absorption by hemoglobin and at the wavelength band (470 nm to 490 nm) suitable for absorption by the large intestine. Therefore, the spectral property is appropriate for observing, as a bright image, a mucous membrane structure and a blood vessel structure in a surface layer. The spectral property in FIG. 6 has the transmittance peaks at the wavelength bands (380 nm to 420 nm and 550 nm to 560 nm) suitable for absorption by hemoglobin. Therefore, the spectral property is appropriate for observing, as a bright image, blood vessel structures in a surface layer and a deep layer together with a mucous membrane structure of an organism. The spectral property in FIG. 7 has the transmittance peak at the wavelength band (550 nm to 560 nm) suitable for absorption by hemoglobin. Therefore, the spectral property is appropriate for observing, as a bright image, a blood vessel structure in a deep layer together with a mucous membrane structure of an organism.

What is claimed is:
1. An electronic endo scope system, comprising:
a light source that emits light including at least a visible light band;
an optical filter that has a transmittance peak at least at a particular wavelength band within a continuous wavelength band including at least the visible light band and that has a transmittance distribution which is larger than zero and is smaller than a half of the transmittance peak within an almost entire region of the continuous wavelength band except the transmittance peak;

a color solid state image pick-up device that receives reflected light from a subject illuminated with illumination light via the optical filter; and an image generating unit that generates a color image which is displayable on a monitor by processing an imaging signal output by the solid state image pick-up device, wherein the transmittance peak is at least two particular wavelength bands of 380 nm to 420 nm, 470 nm to 490 nm and 550 nm to 560 nm, the transmittance distribution extends continuously between the at least two particular wavelength bands, and the at least two particular wavelength bands necessarily include at least one particular wavelength band of 380 nm to 420 nm and 550 nm to 560 nm.

2. The electronic endoscope system according to claim 1, further comprising:

an optical filter switching unit that inserts the optical filter into an illumination optical path of the light source and retracts the optical filter from the illumination optical path.

3. The electronic endoscope system according to claim 2, further comprising:

an operation unit that accepts an input operation of a user, wherein the optical filter switching unit inserts the optical filter into the illumination optical path or retracts the optical filter from the illumination optical path in accordance with the input operation accepted by the operation unit.

4. The electronic endoscope system according to claim 1, wherein the transmittance distribution has the transmission peak at three particular wavelength bands of 380 nm to 420 nm, 470 nm to 490 nm, and 550 nm to 560 nm.

5. The electronic endoscope system according to claim 1, wherein the transmittance distribution has the transmission peak at the two particular wavelength bands of 380 nm to 420 nm and 470 nm to 490 nm.

6. The electronic endoscope system according to claim 1, wherein the transmittance distribution has the transmission peak at the two particular wavelength bands of 380 nm to 420 nm and 550 nm to 560 nm.

\* \* \* \* \*